United States Patent
Schussler et al.

(10) Patent No.: US 9,910,056 B2
(45) Date of Patent: Mar. 6, 2018

(54) DEVICE AND METHOD FOR AN INTERFEROMETRIC MEASURING OF AN OBJECT

(71) Applicant: Polytec GmbH, Waldbronn (DE)

(72) Inventors: Matthias Schussler, Waldbronn (DE); Christian Rembe, Waldbronn (DE); Alexander Drabenstedt, Ettlingen (DE); Sebastian Boedecker, Karlsruhe (DE); Thian-Hua Xu, Karlsbad (DE)

(73) Assignee: Polytec GmbH, Waldbronn (DE)

( * ) Notice: Subject to any disclaimer, the term of this patent is extended or adjusted under 35 U.S.C. 154(b) by 0 days.

(21) Appl. No.: 15/412,424

(22) Filed: Jan. 23, 2017

(65) Prior Publication Data

US 2017/0199214 A1    Jul. 13, 2017

Related U.S. Application Data

(63) Continuation of application No. 13/932,261, filed on Jul. 1, 2013, now Pat. No. 9,551,726.

(30) Foreign Application Priority Data

Jul. 3, 2012    (DE) .................. 10 2012 211 549

(51) Int. Cl.
*G01P 3/36* (2006.01)
*G01H 9/00* (2006.01)

(52) U.S. Cl.
CPC    *G01P 3/36* (2013.01); *G01H 9/00* (2013.01)

(58) Field of Classification Search
CPC .... G01P 5/26; G01P 3/366; G01P 3/36; G01S 17/58; G01S 17/95; G01S 17/50; G01H 9/00
See application file for complete search history.

(56) References Cited

U.S. PATENT DOCUMENTS

| 4,121,295 A | 10/1978 | Witt |
| 6,324,003 B1 | 11/2001 | Martin |
| 2001/0043379 A1 | 11/2001 | Bloom et al. |
| 2004/0130690 A1 | 7/2004 | Koren et al. |

(Continued)

OTHER PUBLICATIONS

Goodman, Joseph W. , "Speckle Phenomena in Optics", p. 47, Jan. 30, 2006.

*Primary Examiner* — Samantha K Abraham
(74) *Attorney, Agent, or Firm* — Volpe and Koeing, P.C.

(57) ABSTRACT

A device for the interferometric measuring of an object, including a source to generate a source beam, a beam splitting device to split the source beam into a measuring beam and a reference beam, an optic interference device and a first detector, which cooperate such that the measuring beam reflected by the object at least partially is at least partially interfered as the receiver beam and the reference beam on a detector area of the first detector. The beam splitting device splits the source beam into a measuring beam, a first partial reference beam, and at least one second partial reference beam. There is at least one second detector embodied such that the first receiver beam is interfered with the first partial reference beam on a detection area of the first detector and the second partial receiver beam with a second partial reference beam on a detection area of the second detector, each with the formation of an optic interference. An assessment unit assesses the measuring signals of the detectors according to the principle of the reception diversity.

16 Claims, 9 Drawing Sheets

(56) References Cited

U.S. PATENT DOCUMENTS

| | | |
|---|---|---|
| 2004/0144176 A1 | 7/2004 | Yoden |
| 2004/0170109 A1 | 9/2004 | Asada et al. |
| 2007/0046945 A1 | 3/2007 | Schwiesow |
| 2008/0285049 A1 | 11/2008 | Rembe et al. |
| 2010/0001872 A1 | 1/2010 | Lian et al. |
| 2010/0289477 A1 | 11/2010 | Reichel |
| 2012/0257197 A1 | 10/2012 | Feldkhun et al. |

DEVICE AND METHOD FOR AN INTERFEROMETRIC MEASURING OF AN OBJECT

INCORPORATION BY REFERENCE

The following documents are incorporated herein by reference as if fully set forth: U.S. patent application Ser. No. 13/932,261, filed Jul. 1, 2013; and German Patent Application No. 10 2012 211 549.8, filed Jul. 3, 2012.

BACKGROUND

The invention relates to a device for an interferometric measuring of as well as a method for an interferometric measuring of an object.

Devices and methods for an interferometric measuring of an object are known in various embodiments: For example a typical design of a laser-Doppler vibrometer is known, which comprises a laser as the radiation source to generate a source beam, a beam splitter device to split the source beam into a measuring beam and a reference beam, an optic interference device, and a first detector.

The measuring beam is guided to a measuring point on the object and the at least partially reflected measuring beam (called "receiver beam") is interfered together with the reference beam on the detector surface of the detector such that by assessing the interference signal conclusions can be drawn, for example regarding a motion of the object surface at the measuring point in the direction of the optic axis of the measuring beam.

Furthermore, arrangements are known, which show a heterodyne structure. Here, typically via a Bragg-cell a frequency shift is caused between the reference beam and the measuring beam. In general, by the interference of the interfered measuring and reference beam an intensity modulation occurs with the frequency of the difference frequency of the two beams. In a heterodyne design the difference frequency of the frequency shift introduced with the Bragg-cell and the Doppler-shift is created by the motion of the object. The frequency shift introduced in the heterodyne design serves in the electrical sense as a carrier frequency, which is frequency modulated by the speed of the object and/or is phase modulated by distance changes of the object.

By way of phase modulation of the modulated carrier signal the movement of the object can therefore be displayed in the distance coordinate. By the frequency modulation of the modulated carrier signal the speed of the object can be displayed.

SUMMARY

The present invention is based on the objective to expand the range of applications of the devices and methods of prior art and/or to increase the measuring accuracy and/or reliability.

The objective is attained in a device for an interferometric measuring of an object as well as in a method for an interferometric measuring of an object according to the invention. Preferred embodiments of the device according to the invention as well as preferred embodiments of the method according to the invention are disclosed in the description below and in the claims. Hereby the wording of all claims is explicitly included in the description by way of reference.

The device according to the invention for an interferometric measuring of an object comprises a radiation source to generate a source beam, a beam splitting device to split the source beam into a measuring beam and a reference beam, an optic interference device, and a first detector.

The interference device and the first detector are embodied cooperating such that the measuring beam, at least partially reflected by the object, (as the receiver beam) and the first reference beam are interfered on at least one detector area of the first detector.

With regards to its basic design the device according to the invention therefore is consistent to interferometers of prior art, particularly typical laser-Doppler vibrometers known from prior art show such a design.

It is essential that in the device according to the invention the beam splitter device is embodied to split the source beam into a measuring beam, a first partial reference beam, and at least a second partial reference beam and that the beam splitter device is embodied to split the receiver beam into a first partial receiver beam and at least a second receiver beam. Contrary to devices of prior art here the receiver beam and the reference beam are each split into at least two partial beams.

Furthermore, the device according to the invention comprises at least one second detector and is embodied such that a first receiver beam is interfered with the first partial reference beam on a detection area of the first detector and the second partial receiver beam with the second partial reference beam on a detection area of the second detector, each with the formation of an optic interference.

The device according to the invention further comprises an assessment unit to assess the measuring signals of the first and the second detector, which assessment unit being embodied to assess the measuring signals of the two detectors according to the principle of reception-diversity.

The invention is based on the recognition of the applicant that frequently the surfaces of the object influence the measuring beam such that a reduction of the precision of said measurement results or the measurement even fails.

The wide range of application of devices for an interferometric measuring of an object and particularly vibrometers is caused in the fact that these devices are not only used to measure objects with a surface considered ideal for optically reflecting, but they are also used to measure objects with uncooperative and particularly rough surfaces. A measuring beam is typically diffusely dispersed by a rough surface and the dispersion of intensity of the receiver beam is therefore characterized in speckles. The speckles are caused in the phase differences of the measuring beam, which due to the roughness of the surface of the measuring object is distributed to various object point distanced from the device, with in each direction independently the resulting overall intensities lead to values strongly deviating from each other. Depending on the composition and alignment of the surface to be measured therefore very high overall intensity may develop; however it is also possible that due to the phase differences a very low or even an intensity of 0 develops. Additionally, on the detector area of the detector the interference of many distributed light contributions with different phases leads to the overall intensity showing wide variations.

Due to the fact that the noise level of the position to be measured on the object or the speed increases with reducing signal strength the quality of the measurement is therefore depending on the pattern of the speckles. The pattern of the speckles is variable though and fluctuates particularly depending on the actual measuring point and the alignment of the surface of the object.

Furthermore, the above-mentioned phase differences between the speckles are measured as an apparent movement: due to the phase differences between the speckles large reductions in the strength of the measuring signal may develop (so-called "drop-outs"), because the light contributions can completely compensate each other. The assessment of the measuring signal of the detector then shows a seeming gap in the position of the surface of the object to be measured, with the gap being approximately equivalent to one fourth of the wavelength of the measuring beam used. This results in a respectively high peak, for example in the assessed speed, which however is not matched by a respective real motion of the object.

When furthermore a scanning measurement is performed, in which the measuring beam is moved over a plurality of measuring points on the object and/or when the radiation source of the device and the surface of the object are not optimally fixed in reference to each other and/or when by atmospheric striation effects a deflection of the measuring beam occurs, the received pattern of the speckles is changed and the signal to be assessed is falsified and particularly shows temporarily deep signal drops.

The invention now uses the knowledge that the above-mentioned signal drops typically occur randomly (but still can be statistically described) and under typical measuring conditions only a low percentage of the measuring time and/or the measuring points to be measured relate to the surface of the object. When two or more independent crude signals at different points of time show the above-mentioned drop-outs and the crude signals are statistically independent or at least approximately or preferably essentially statistically independent then the probability that in two measuring channels simultaneously a drop-out occurs is the product of the probability thereof for each individual channel. This combined probability is much lower than it is for an individual channel. Therefore, this means that the probability of the above-mentioned drop-outs can be considerably reduced.

The principle of reception diversity is known in the technical field of radio transmission and is here also called antenna diversity. In antenna diversity a receiver for radio signals comprises at least two antennas, with their signals each being assessed with regards to the level or best noise distance and based on this assessment one of the signals is used for processing.

For the first time the present invention now transmits the principle of reception diversity to the interferometric measuring of an object.

By the splitting of the reference beam into a first and second partial reference beam as well as the receiver beam into a first and second partial receiver beam and the respective interference as described above on the detection areas of the first and the second detector here separate measuring signals of at least two detectors are provided, which can be compared in an analogy to the two receivers of the antenna diversity.

In the present invention it is also essential that an assessment occurs based on a quality criterion which allows an assessment of the quality of the measuring data of the first detector in reference to the quality of the measuring data of the second detector, which dependent on the respectively determined quality values comprises either only one measuring signal of one of the two detectors or a combined measuring signal of both detectors, with here the above-mentioned combination may also include a weighing dependent on the quality applied.

For the present invention it is therefore not only essential that an assessment of data of the receiver beam occurs via two detectors but that via the two detectors the receiver beam is assessed with regards to different criteria. Via the first detector therefore at least partially another piece of information included in the receiver beam is assessed in comparison to the information of the receiver beam (at least partially) assessed via the second detector.

Examinations of the applicant have shown that the above-mentioned separation of the information included in the receiver beam and the allocation on the one hand to the first detector and on the other hand to the second detector is performed preferably with regards to at least one of the following criteria:

a. Separation with Regards to Polarization

Here different polarization portions of the receiver beam are displayed on the first and the second detector. This is advantageous particularly in objects to be measured which show a diffusely dispersing surface. In particular, non-metallic surfaces are typically diffusely dispersing areas. It is known that light diffusely dispersed at non-metallic surfaces loses any previously defined polarization and thus is randomly polarized, see Goodman, Joseph W., "Speckle phenomena in optics", page 47 ff, 2007 Roberts and Company Publishers.

In particular, in such diffusely dispersing surfaces a separation offers a cost-effectively realized possibility with regards to polarization to generate measuring signals at the first and the second detector, with the signal drops of the measuring signals of the first measuring detector being statistically independent or at least essentially statistically independent in reference to the signal drops of the measuring signals of the second measuring detector.

b. Spatial Separation

Here the receiver beam is spatially split into at least a first and a second sub-section of the cross-section of the beam and the first sub-section is forwarded to the first detector and the second sub-section to the second detector.

Thus a spatial split occurs, in which sub-sections of the cross-section of the beam are either forwarded to the detector 1 or the detector 2. In a preferred embodiment the receiver beam is split into a right half as the first sub-section and a left half as the second sub-section, i.e. half of the cross-section of the beam is allocated to the first sub-section and the other half to the second sub-section.

In this variant therefore a split of the spatial information of the receiver beam occurs. Examinations of the applicant have shown that particularly in metallic surfaces such a spatial splitting of the receiver beam also leads to the desired statistic independence or at least an essentially statistic independence of the signal drops of the signals of the first detector from the signal drops of the measuring signals of the second detector.

c. Modal Split

Here, a splitting of the receiver beam occurs such that at least partially different beam modes are guided to the detector 1, particularly beam-transversal modes, in reference to the detector 2. For example, only a Gauss-basic mode of the receiver beam may be guided to the detector 1, and only additional parts of the receiver beam to the detector 2, particularly high beam modes without any Gauss-basic modes.

The splitting with regards to different beam modes of the receiver signal also causes that the signal drops of the measuring signals of the first detector are statistically independent or at least approximately statistically independent from the signal drops of the measuring signals of the second detector.

Thus, the device according to the invention connects for the first time a device for an interferometric measuring of an object with an assessment according to the principle of reception diversity. For this purpose, the device according to the invention comprises at least two detectors, on which one partial receiver beam and one partial reference beam are each interfered.

The method according to the invention for the interferometric measuring of an object comprises the processing steps:
  Generating a source beam via a radiation source;
  Splitting the source beam into at least one measuring beam and at least one reference beam;
  Impinging at least one measuring point on the object with the measuring beam as the transmitter beam, and
  Interfering the measuring beam, at least partially reflected and/or dispersed by the object, as the receiver beam with the reference beam on a detection area of a first detector with here forming an optic interference.

These reference steps are known from a measuring process of prior art, particularly the vibrometer measuring process.

It is essential that the source beam is split into a measuring beam, a first partial reference beam, and at least a second partial reference beam, and the receiver beam is split into a first partial receiver beam and at least a second partial receiver beam. The first partial receiver beam is interfered with the first partial reference beam on the detection area of the first detector and the second partial receiver beam with the second partial reference beam on a detection area of a second detector, each with here forming an optic interference. The measuring signals of the first and the second detector are assessed according to the principle of reception diversity.

The method according to the invention therefore comprises the advantages mentioned above in the description of the device according to the invention.

The method according to the invention is preferably embodied to be performed via a device according to the invention and/or a preferred embodiment thereof. The device according to the invention is preferably embodied to perform the method according to the invention and/or an advantageous embodiment thereof.

In particular, in the method according to the invention preferably a splitting of the receiver beam occurs with regards to at least one of the criteria a) polarization, b) spatial splitting, and c) splitting with regards to the beam modes as described above.

The device preferably comprises at least one optic beam splitter, which is arranged in the radiation path of the receiver beam and/or the first and/or the second partial receiver beam and is embodied such that via the first and the second detector different polarization portions and/or different spatial parts and/or different modes of the receiver beam can be assessed.

In this preferred embodiment therefore a splitting is performed with regards to the two beam components using the optic beam splitter such that in a light-efficient fashion a splitting of the respective beam occurs and a splitting with regards to information, particularly according to one of the above-mentioned criteria.

The scope of the invention includes that only one or several partial beams are influenced via optic components in order to allow an assessment according to the principle of reception diversity. For example it is possible that respective optic elements are arranged only in the radiation path of the first and/or the second reference beam, for example polarization controls. Because an interference typically occurs when partial reference and partial receiver beams, allocated to each other, are interfered only with regards to identically embodied components of the two beams. When for example the first partial reference beam is linearly polarized in a predetermined spatial direction typically via the first detector an interference and thus a respective measuring signal also occurs only with regards to identical polarized components of the first partial receiver beam.

Accordingly it is within the scope of the invention to influence for example one or both partial reference beams via optic means, particularly optic filters, in order to distinguish the interference formed at the first detector with regards to the information content of the partial receiver beam influencing from the interference formed at the second detector. However it is advantageous to influence the first and/or the second partial receiver beam via optic means, particularly via optic filters. This way the same result can be achieved, however here typically an assessment with a lower loss of intensity is compared, based on the intensity of the incoming receiver beam, with the intensity of the first and the second partial receiver beam ultimate contributing to the assessment.

In a particularly advantageous embodiment therefore an optic beam splitter is arranged in the radiation path of the receiver beam which on the one hand splits the receiver beam into the first partial receiver beam and the second partial receiver beam and additionally yields the desired splitting, particularly additionally a splitting with regards to the polarization components and/or the spatial components and/or the modes of the receiver beam.

For example, so-called polarization beam splitters are known, which split an incident beam into two partial beams with different polarizations, i.e. with separated polarization portions of the incident beam. Such a polarization beam splitter of prior art can cause easily and cost-effectively a desired splitting of the receiver beam into a first and second partial receiver beam in the device according to the invention.

When embodying the device according to the invention with regards to a splitting of the receiver beam according to criterion a), i.e. with regards to the polarization components, the beam splitting device comprises a polarization device, which polarization device being embodied such that via the first and the second detector polarized portions of the receiver beam can be assessed, which are orthogonal in reference to each other. The characterization "orthogonally polarized portions" relate here and in the following to all states of polarization which can be generated by an arbitrary phase delay plate, preferably without any loss of intensity from linearly perpendicular, polarized conditions. For example, perpendicularly aligned to each other, linear polarization portions represent such orthogonally polarized portions. Additionally, oppositely circular polarization portions represent such orthogonally polarized portions. Additionally, two different elliptic, polarized polarization portions represent orthogonally polarized portions, if the two elliptic polarized portions can be converted via a phase delay plate without any loss of intensity into linear, polarized portions aligned perpendicular in reference to each other.

In particular, the above-mentioned polarization devices preferably comprises a polarization beam splitter, which is arranged in the radiation path of the receiver beam such that the receiver beam is split into the first partial receiver beam and the second partial receiver beam and the first and second partial receiver beam comprise different polarization components of the receiver beam, preferably orthogonally polarized portions of the receiver beam.

The use of a polarization beam splitter represents a cost-effective realization, as described above.

In the above-mentioned embodiment of the device according to the invention it is particularly advantageous that the polarization beam splitter additionally is arranged in the radiation path of the reference beam, so that via the polarization beam splitter the reference beam is split into the first and second partial reference beam.

The use of only one polarization beam splitter to split and to divide according to polarization both the reference beam as well as the receiver beam represents a cost-effective and space-saving realization. In particular, in this variant only one beam splitter must be adjusted in the radiation path for the precise interference of the measuring and reference beams, so that compared to other designs the adjustment of the optic components is simplified. Here, the reference beam preferably shows a polarization status, which is divided by the PBS into two essentially equally strong beams (with regards to intensity). In the interfered pairs of radiation allocated to the individual detectors the polarizations of the measuring and the reference beam are arranged perpendicular in reference to each other. Without losing any power these pairs of radiation can each be converted with a half-wave plate and a PBS into one pair of beams each, in which the polarizations are parallel and thus capable for interference and between which a phase difference of 180° is given in the applied interference modulation. Such pairs of beams can advantageously be converted into electric signals using a differential detector.

Preferably in the described embodiment of the device according to the invention the optic axes of the transmitting and the receiver beam are at least spatially separated side-by-side between a beam outlet of the device and the object, preferably parallel next to each other.

This way in a simple fashion a spatial separation is possible in the radiation path of the device between the measuring beam and the receiver beam.

In particular, here it is advantageous that in the radiation path of the measuring beam and the receiver beam a transceiver lens, as described above, is arranged, particularly as a component of an objective. Preferably the axes of the beams of the measuring and the receiver beam penetrate parallel and spatially separated an aperture of the transceiver lens.

In order to here yield an optimal utilization of the aperture and thus, as described above, an optimal light intensity and ultimately signal strength of the measuring signal it is advantageous that the beam intensity profile of the measuring and/or receiver beam, preferably both beams, is formed such that the aperture of the transceiver lens is utilized primarily. In this preferred embodiment it is therefore avoided that partial sections of the aperture of the transceiver lens are penetrated not at all or with low intensity by the measuring or receiver beam. In particular it is here advantageous that the beam intensity profile of the measuring or receiver beam, preferably both beans, is elliptical, particularly with an axial ratio ranging from 1:1.5 to 1:2.5. The goal of this advantageous embodiment is to "fill" the aperture of the transceiver lens with the transmitter and receiver beam to the extent possible. The side-by-side arrangement of two beams with an elliptic beam intensity profile (is preferred), with the primary axes of the ellipses preferably being arranged parallel in reference to each other.

The device according to the invention preferably comprises a signal processing unit, which signal processing unit is embodied to generate a combined output signal from the measurements of the first and the second detector.

Thus, via the signal processing unit the assessment of the measuring signals of both detectors is possible according to the principle of the reception diversity.

As described above, in the assessment of the measuring signals according to the principle of the reception diversity it is essential that both the measuring signal of the first detector as well as the measuring signal of the second detector are assessed according to a quality criterion and depending on the two quality criteria a signal is formed, which ultimately represents the output signal to be assessed.

Here the scope of the invention includes to always use the signal for processing which shows the higher quality rating similar to a binary switch.

The scope of the invention also includes forming a combined output signal from the measuring signal of the first detector and the measuring signal of the second detector, with a weighing occurring based on the above-described quality assessment. In a preferred embodiment the quality signal may be formed depending on the signal strength of the measuring signal so that the detector showing a higher signal strength of the measuring signal being given a higher quality rating compared to the other detector with a lower signal strength of the measuring signal.

The quality assessment is preferably performed continuously. In a practical implementation, for example by establishing a computer-controlled assessment unit, typically a discrete assessment is performed using assessment points following soon after each other. Typically here the assessment is performed with a clock rate ranging from 1 kHz to 100 kHz.

In particular it is advantageous to perform a quality assessment of the measuring signal of the first detector and the measuring signal of the second detector in consideration of the signal power and/or the amplitude of the measuring signal.

Here it is advantageous that for the first measuring signal a first weighing factor is formed and for the second measuring signal a second weighing factor, which weighing factors are complementary in reference to each other and are each dependent on the first and the second measuring signal, preferably dependent on the amplitude of the first and the second measuring signal or the power of the first and the second measuring signal. In particular it is advantageous that the weighing factors are formed such that here the measuring signal with the greater amplitude is respectively given a greater weight than the amplitude with the lower amplitude. A plurality of mathematic formulations is possible, which fulfill this principle. A particularly preferred realization is to calculate the weighing factors such that their ratio is equivalent to the ratio of the electric signal amplitudes.

For an optimal adjustment of the device according to the invention and for an optimal implementation of the method according to the invention it is advantageous when the polarization state of the measuring and/or receiver beam is influenced via an optic component such that the receiver channels of both detectors show essentially the same signal strengths during the measuring of a metallic reflective object. It is particularly advantageous when an optic means is used showing an optic delay plate.

In this preferred embodiment therefore an "advance" optimization occurs such that a measuring object with a metallic reflective surface is used as the optimizing standard and via an optic means, preferably via an optic delay plate, the measuring beam and/or the receiver beam are influenced with regards to the polarization state such that during the measuring process of the metallic reflective surface the first and the second detector show essentially equivalent signal strengths.

By this adjustment the advantage develops that the radiation paths to both detectors can be adjusted symmetrically in order to yield identical signal strengths. Then both channels show on all types of surfaces on average the same signal strengths and contributed equally to the overall signal.

As already mentioned, the interferometer is preferably embodied as a heterodyne interferometer. In particular the interferometer preferably shows an optic frequency shift unit, which preferably is embodied as a Bragg-cell. The frequency shift unit is preferably arranged in the radiation path of the measuring beam and/or the reference beam.

This way, the above-described heterodyne embodiment known per se can be achieved.

BRIEF DESCRIPTION OF THE DRAWINGS

Additional preferred features and embodiments of the method according to the invention and the device according to the invention are described in the following using figures and exemplary embodiments.

Here shown are.

DETAILED DESCRIPTION OF THE PREFERRED EMBODIMENTS

Figure 1:
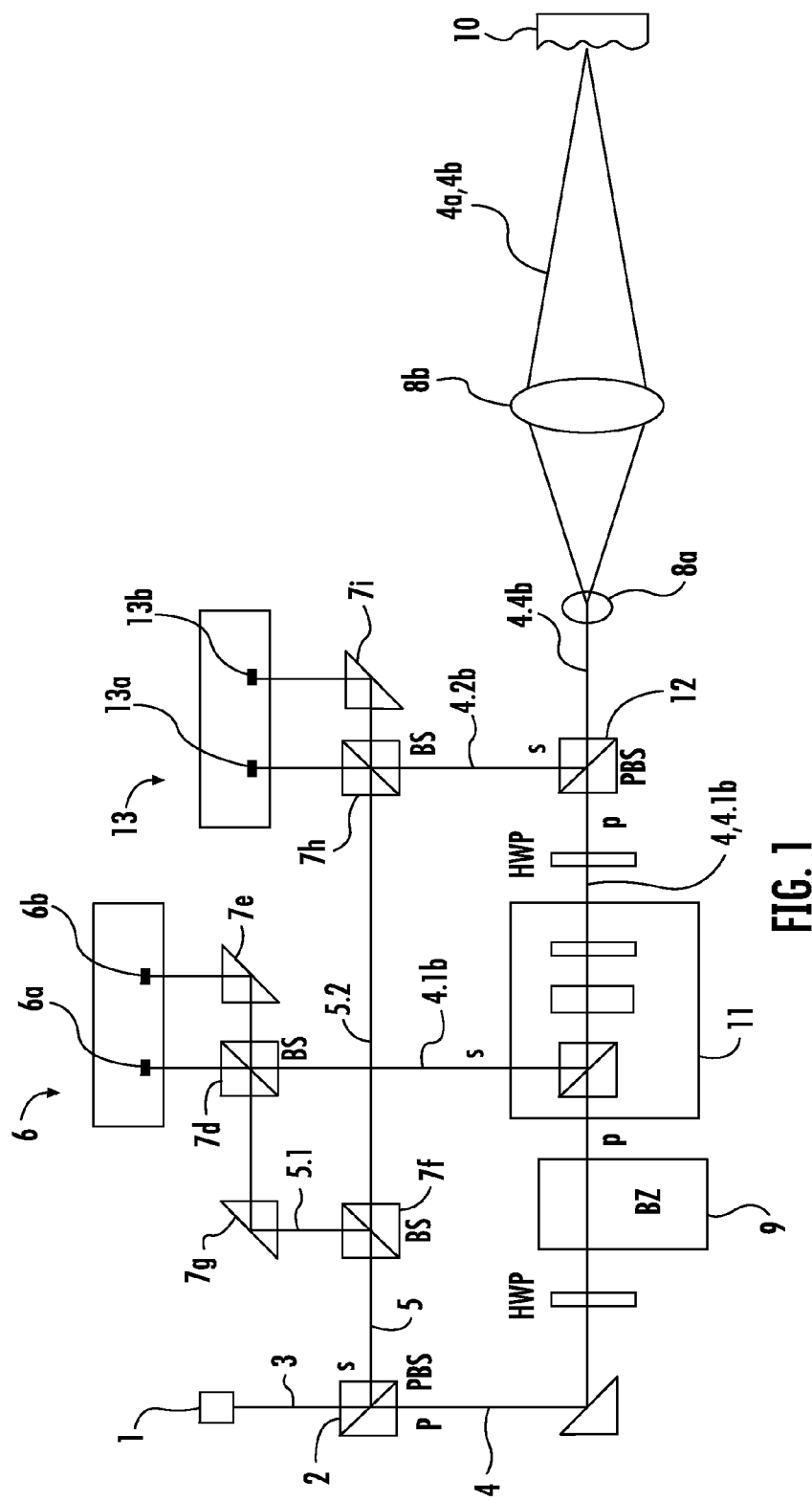
FIG. 1 is a view of a first exemplary embodiment of a device according to the invention, in which a transmitter beam and a receiver beam interfere each other coaxially.

All figures represent schematic drawings, which are not shown true to scale. Identical reference characters mark identical elements or some with equivalent effects.

Figure 5:
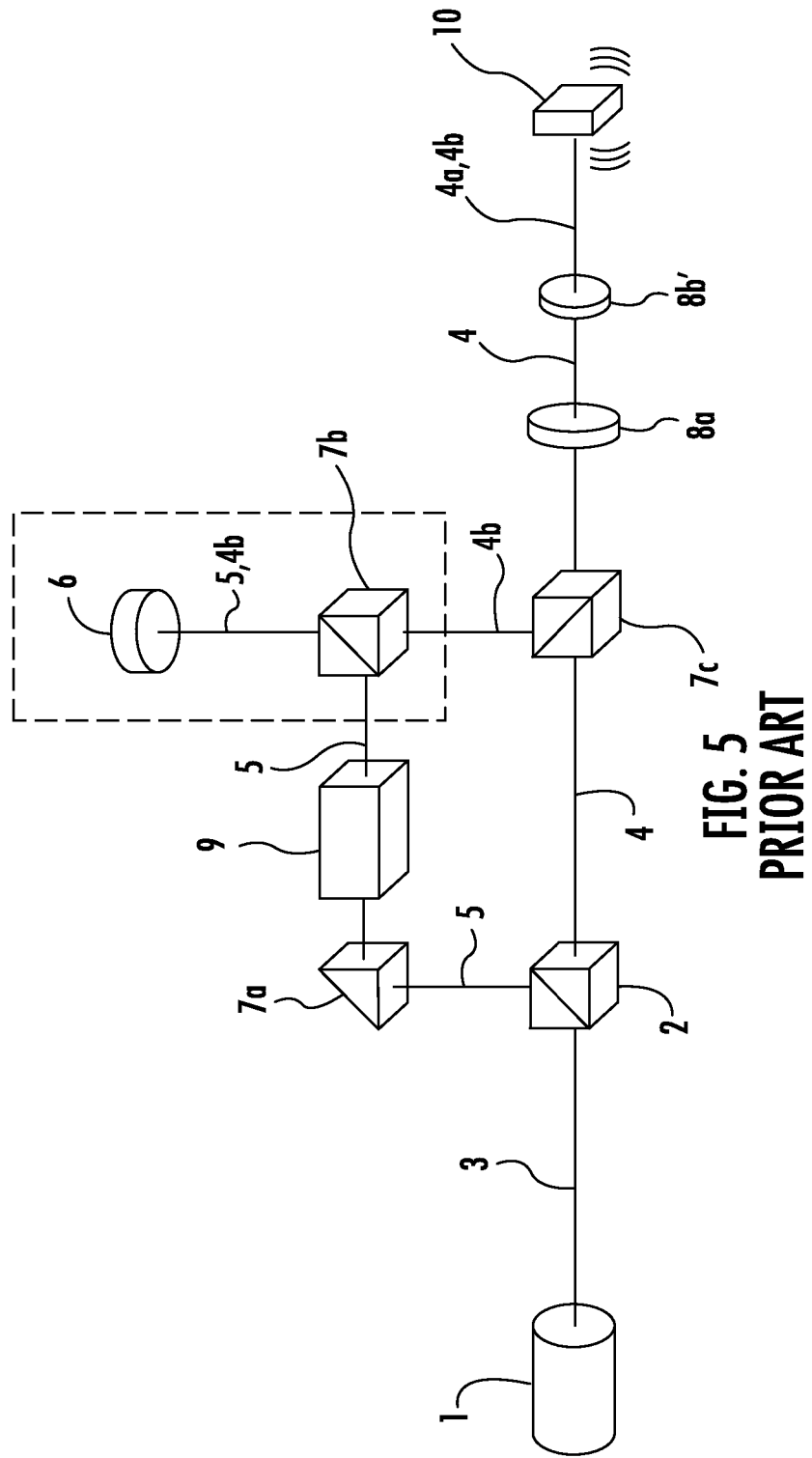
FIG. 5 is a view of a heterodyne laser vibrometer according to prior art.

FIG. 5 shows a device for an interferometric measuring of an object, which is known from prior art and is embodied as a vibrometer. The device comprises a radiation source 1 embodied as a laser to generate a source beam 3 embodied as a laser beam, a beam splitting device 2 embodied as a beam splitting cube to split the source 3 into a measuring beam 4 and a reference beam 5.

The device further comprises an optic interference device and a first detector 6.

The optic interference device comprises a prism 7a as well as optic beam splitters 7b and 7c.

The device further comprises a beam output for the measuring beam 4, which is embodied as an objective. The objective comprises an optic lens 8a and a quarter-wave plate 8b', with the optic lens 8a being embodied as a transceiver lens system.

The interferometer according to FIG. 5 is embodied as a heterodyne interferometer. For this purpose a Bragg-cell 9 is arranged in the radiation path of the reference beam 5.

The laser beam generated by the radiation source 1 embodied as a laser (showing a wavelength of e.g., 633 nm) is split via the beam splitting device 2 into the measuring beam 4 and the reference beam 5. The measuring beam 4 passes the optic beam splitter 7c, the optic lenses 8a, and is converted by the quarter wave plate 8b' into circular polarization and here as a transmitter beam 4a exits the device and impinges an object 10 to be measured.

The transmitter beam 4a, at least partially reflected by the object 10, impinges as the receiver beam 4b once more the quarter wave plate 8b'. During the reflection of the transmitter beam 4a at a reflective surface the circular polarization is inverted in its direction of rotation. After a renewed passing of the quarter wave plate the direction of polarization is now rotated by 90°. After passing the receiver lens 8a the beam is now laterally reflected by the polarization beam splitter 7c and is guided via the optic beam splitter 7b to the first detector 6.

The reference beam 5 is guided via the prism 7a, passes the Bragg-cell 9, and is interfered via the beam splitter 7b on a detector area of the first detector 6 with the receiver beam 4b forming an interference.

Using an assessment unit (not shown) the measuring signals of the first detector 6 are evaluated by movements of the object in the direction of the receiver beam 4b being detected by phase modulation of the of the modulated carrier signal and by frequency demodulation of the speed of the moving surface of the object 10.

The basic principle of the vibrometer according to FIG. 5 is also based on the exemplary embodiments of the device according to the invention. In order to avoid repetitions, in the following the essential differences are discussed.

In the first exemplary embodiment of a device according to the invention shown in FIG. 1 the transmitter beam 4a and the receiver beam 4b are located coaxially over top of each other. In this advantageous embodiment it is possible in a particularly advantageous fashion to guide the transmitter beam and the receiver beam via a common lens, a transceiver lens. The measuring beam therefore exits via the transceiver lens out of the radiation path of the device according to the invention, extends as the transmitter beam to the object, is reflected thereby and/or dispersed, travels as the receiver beam back to the device according to the invention, and reenters via the transceiver lens the radiation path of the device. This way, an optimal utilization of the aperture of the transceiver lens and/or an objective comprising the transceiver lens is possible. An optimal utilization of the aperture allows an optimal light yield and an optimal signal strength.

Complementary to the standard design of prior art according to FIG. 5 in the exemplary embodiment according to FIG. 1 a magneto-optic circulator 11 is arranged in the radiation path of the measuring beam 4. Here the measuring beam 4 passes the Bragg-cell 9, the circulator 11, and after passing through the objective, comprising the optic lenses 8a and 8b, impinges the object 10 to be measured (transmitter beam 4a). The transmitter beam 4a, at least partially reflected or dispersed by the object 10, reenters via the optic lens 8b the radiation path of the device as the receiver beam 4b and is split via the polarization means 12, embodied as a polarization beam splitter PBS, into the polarization components p and s.

The polarization component p passes again the circulator as the first partial receiver beam 4.1b and thus changes the polarization into a s-polarization and is deflected via a polarization beam splitter of the circulator in the direction of the first detector 6.

The first detector 6 in turn comprises two detectors 6a and 6b. Via another optic beam splitter 7d the first partial receiver beam 4.1b is in turn split into two partial beams, with a first partial beam being guided on the detector 6a of the first detector 6 and a second partial beam via a prism 7e to a detector 6b of the detector 6.

The reference beam 5 is split via another beam splitter 7f, with a portion being guided as a first partial reference beam 5.1 via another prism 7g and the beam splitter 7g to the detector 6a of the first detector 6, causing the partial reference beam 5.1 once more to be split via the beam splitter 7b, so that a second part of the first partial reference beam 5.1 is guided via the prism 7e to the detector 6b of the first detector 6.

The detector 6 therefore comprises two detectors 6a and 6b, at each of which an interference occurs of a portion of the first partial receiver beam 5.1b with a portion of the first partial reference beam 5.1, respectively with the embodiment of an interference.

The device according to the first exemplary embodiment shown in FIG. 1 further comprises a second detector 13, which also comprises two detectors 13a and 13b.

The s-component of the receiver beam 4b, split off via the polarization means 12, is guided as the second partial receiver beam 4.2b in the direction of the second detector 13, impinges another optic beam splitter 7h, and is guided similar to the balanced-detector arrangement of the first detector 6 with a partial beam to the detector 13a and with a second partial beam via another prism 7i to the detector 13b.

The reference beam 5 is split via the optic beam splitter 7f into the above-described first partial reference beam 5.1 and a second partial reference beam 5.2 and the second partial reference beam 5.2 impinges the beam splitter 7h, is here once more split, and on the one side guided to the detector 13a and on the other side via the prism 7i to the detector 13b.

Thus, also at the second detector 13 partial beams of the second partial receiver beam 4.2b are each interfered at the detectors 13a and 13b with partial beams of the second partial reference beam 5.2.

The device according to a first exemplary embodiment of the device according to the invention shown in FIG. 1 shows some advantages in reference to the design according to FIG. 5:

Firstly, both directions of polarization (p and s) of the receiver beam 4b can be detected, on the one hand by the first detector 6 and on the other side by the second detector 13. In measurements on a large class of types of surfaces, all non-metallic rough surfaces, both directions of polarization occur. Then the detection of both directions of polarization leads to an increase of the evaluated light intensity and hereby a better signal-noise ratio is yielded. Due to the fact that both partial receiver beams originate in polarized components of the entire receiver beam, perpendicular in reference to each other, the signal drops at the first detector 6 are statistically independent from the signal drops at the second detector 13.

The embodiment of the first detector 6 with two detectors 6a and 6b and the second detector 13 with two detectors 13a and 13b is respectively equivalent to the embodiment of a detector in the "balanced detector—arrangement" known per se:

The measuring signals of the detector 6 are determined in a manner known per se similar to a balanced-detector arrangement from the measuring signals of the detectors 6a and 6b. Additionally, the measuring signals of the second detector 13 are determined in balanced detectors in a manner known per se from the measuring signals of the detectors 13a and 13b. A first detector 6 and a second detector 13 are therefore typically also called differential detectors.

It is now further essential that via an assessment unit (not shown) the measuring signals of the first detector and the second detector 13 are evaluated according to the principle of the reception diversity.

For this purpose, the power of the modulated carrier signal is determined for the measuring signal of the first detector 6 and for the measuring signal of the second detector 13 each via a power measuring step. Additionally, FM-demodulation is generated for both the measuring signal of the first detector 6 as well as for the measuring signal of the first detector 13. Via a selection now always the speed signal is used as the output signal, which is allocated to the detector with the greater power.

This way, the probability is considerably reduced that a faulty speed signal is issued as the output signal because the reductions of the measuring signal of the first detector 6 in reference to the reductions of the measuring signal of the second detector 13 are statistically independent.

The axes of the transmitter beam 4a and the receiver beam 4b extend parallel and over top of each other in the device according to FIG. 1 between the optic lens 8a and the object 10, i.e. the measuring beam 4a and the receiver beam 4b are coaxial. This way an optimal utilization of the aperture of the objective comprising the optic lenses 8a and 8b is yielded and thus any loss of light intensity and thus a loss of the intensity of the measuring signal is avoided.

Figure 2:
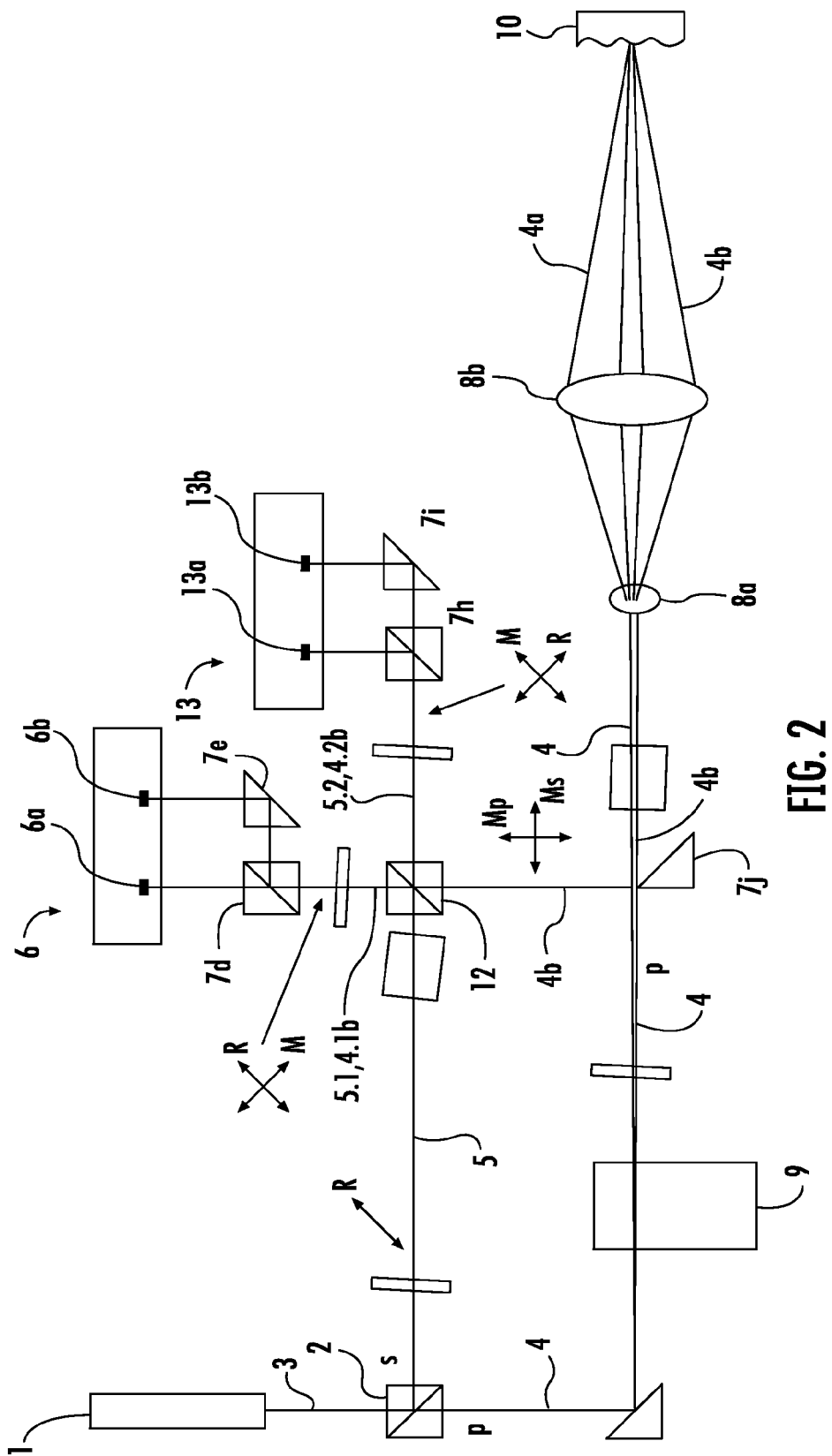
FIG. 2 is a second exemplary embodiment of a device according to the invention, in which the transmitter beam and the receiver beam are located side-by-side.

FIG. 2 shows a second exemplary embodiment of a device according to the invention, which comprises a first detector 6 and a second detector 13 in an analog embodiment as a balanced detector as shown in FIG. 1.

Unlike the first exemplary embodiment in the second exemplary embodiment shown in FIG. 2 the transmitter beam 4a extends not coaxial in reference to the receiver beam 4b.

The receiver beam 4b extends between the optic lens 8b and the object 10 and the transmitter beam 4a between the prism 7i and the optic lens 8a side-by-side in reference to each other, with parallel axes of the beam, separated from each other, the receiver beam 4b and the transmitter beam 4a are focused via the optic lenses 8a and 8b on a measuring point on the object 10.

Due to the axes of the beams being located spatially side-by-side here in a simple fashion via a reflector 7j the receiver beam 4b can be split. In this exemplary embodiment therefore a splitting can occur between the receiver beam 4b and the transmitter beam 4a, without here certain conditions being required regarding the polarization of these beams, because the splitting can occur without any polarization beam splitter in a simple fashion due to the axes of the two beams being located spatially side-by-side.

The receiver beam 4b therefore comprises a mixed polarization and is split via the polarization means 12 embodied as a polarization beam splitter into the first partial receiver beam 4b.1 and the second partial receiver beam 4.2b, with these two partial receiver beams therefore showing polarization portions perpendicular in reference to each other.

In this exemplary embodiment it is particularly advantageous that the reference beam 5 is also split via the polarization means 12 into the first partial reference beam 5.1 and the second partial reference beam 5.2.

This leads to the advantage, here, that beam splitting occurs both of the receiver beam 4b as well as the reference beam 5 with the polarization means 12, i.e. with a single polarization beam splitter. This way the adjustment of the optic elements is designed in a considerably simplified fashion.

Similar to the first exemplary embodiment according to FIG. 1 an interference of a partial receiver beam occurs with the corresponding partial reference beam respectively at the detectors 6a and 6b of the first detector 6 as well as the detectors 13a and 13b of the second detector, with the formation of an optic interference.

Based on the arrangement according to FIG. 2, following the polarization means 12, the reference light portion and the measuring light portion are polarized each perpendicular in reference to each other. In order for these portions to interfere with each other from the detectors one polarizer (not shown) each is used, which for example may be embodied as a polarization filter or PBS. Via the polarizers here at each of the detectors 6a, 6b, 13a, and 13b the respective portions contained in both polarizations are projected in the axes of the detection element. For this purpose the axes of the polarizer must be aligned essentially at an angle of 45° in reference to the polarizations in the beam and/or the polarizations must be rotated with the half-wave plates accordingly to the axes of the polarizer. Additionally, both components of the polarization may be converted with a quarter-wave plate into clockwise and/or counter-clockwise circularly polarized components.

It is essential that the respective polarization portions are modified such that one interference each occurs at the detectors 6a, 6b, 13a, 13b.

If the above-stated variant is selected such that the polarization is respectively influenced via a PBS the intensity modulations in the developing beams are of opposite phasing and thus can advantageously be converted with a differential detector into respective measuring signals.

The second exemplary embodiment according to FIG. 2 furthermore shows the advantage that polarization beam splitters (polarization means 12, polarization beam splitter 7d and polarization beam splitter 7k) are used as essential optic components. Thus the same part is used as the essential optic components.

Unlike in the first exemplary embodiment according to FIG. 1, in the second exemplary embodiment according to FIG. 2 the transmitter beam 4a and the receiver beam 4b are therefore not located coaxially over top of each but the optic axis of the transmitter beam 4a and the receiver beam 4b are located side-by-side. Accordingly, in the embodiment according to FIG. 2, the signals of the first detector 6 and the second detector 13 can also be allocated to a measuring point because, although the transmitter beam 4a and the receiver beam 4b show different spatial angles in front of the object 10, however they originate at the same measuring point. In the second exemplary embodiment according to FIG. 2 therefore also a splitting is given according to the polarization information of the receiver beam, similar to the first exemplary embodiment according to FIG. 1, but no splitting regarding the measuring location.

As explained above, it is advantageous to utilize the numeric aperture of the object comprising the optic lenses 8a and 8b as optimal as possible in order to yield a maximum high light intensity and thus a maximum high measuring signal intensity.

Figure 3:
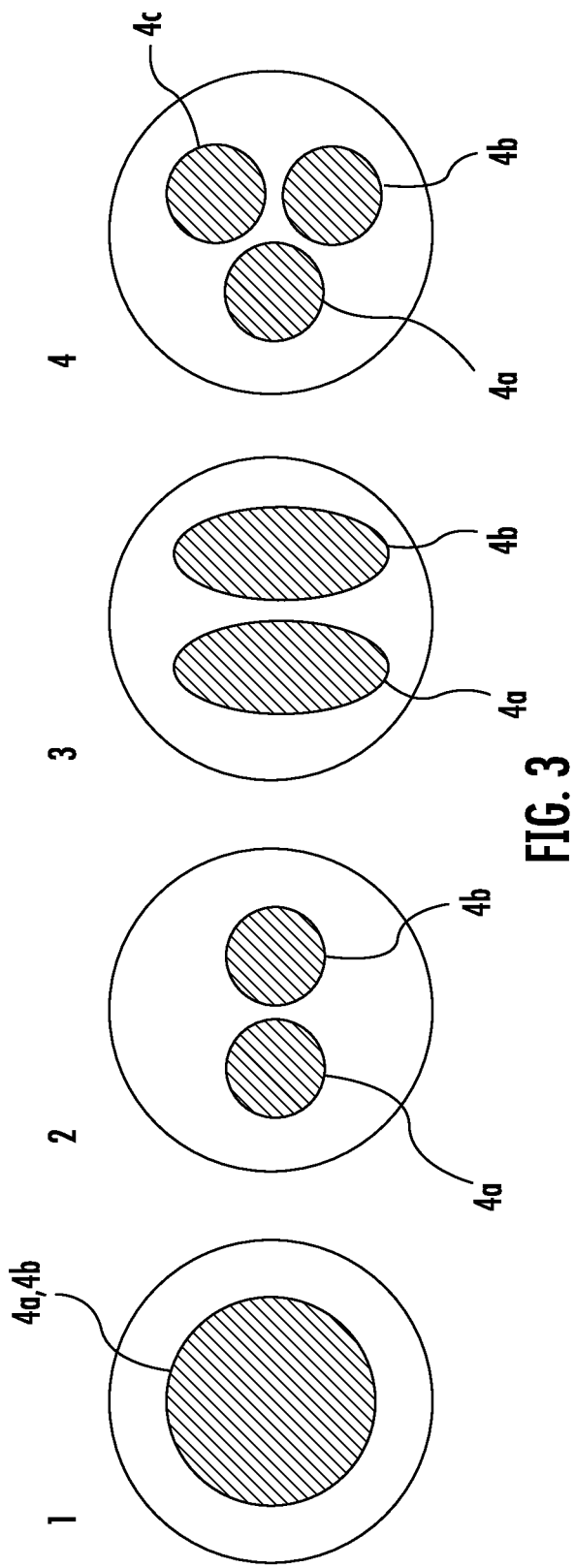
FIG. 3 shows four frontal views of a transceiver lens with different arrangements of the transmitter beam and the receiver beam and different beam profiles.

If the receiver beam 4b and the transmitter beam 4a extend coaxially between the objective and the object 10 an arrangement according to the schematic illustration in FIG. 3.1 is advantageous, this means a utilization of the aperture with an area as wide as possible by the receiver beam 4b and the transmitter beam 4a both being located coaxially over top of each other.

If the advantageous embodiment according to the second exemplary embodiment as shown in FIG. 2 is selected, an arrangement according to the partial image of FIG. 3.2 can be selected. Here, the transmitter beam 4a and the receiver beam 4b are located side-by-side with regards to the aperture of the objective. However, it has shown that this fails to represent an optimal utilization of the aperture.

Thus it is advantageous to design the intensity profile of the transmitter beam 4a and the receiver beam 4b elliptical as shown in the partial illustration of FIG. 3.3. This way a considerably better utilization of the aperture is achieved and thus a higher intensity compared to the partial illustration of FIG. 3.2.

Additionally it is possible to accept several receiver beams and to assess them in the device using separate but identical processing units such that then accordingly more channels contribute to the overall signal.

Such an arrangement is shown in detail in FIG. 3.4, comprising the transmitter beam 4a, the receiver beam 4b, and a second receiver beam 4c. In this case a total of 4 independent measuring channels are yielded, which are first individually assessed according to the principle of the diversity-reception and are then combined to form a joint signal.

In the advantageous embodiment with elliptical beam cross-sections according to the detail of FIG. 3.3 the asymmetry ratio is given both of the transmitter beam 4a as well as the receiver beam 4b ranging from 1.5 to 2.5.

Figure 4:
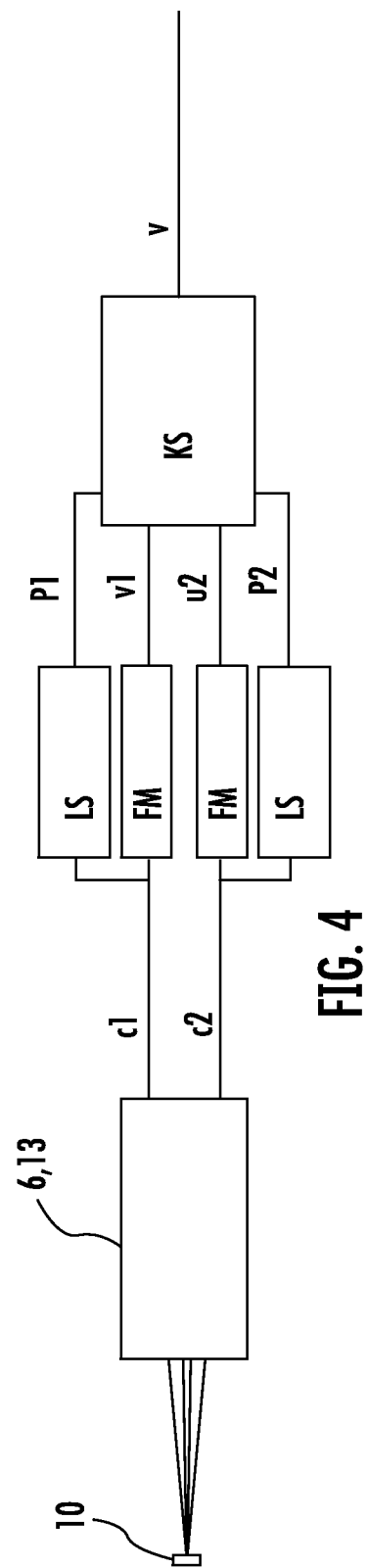
FIG. 4 is a view of a third exemplary embodiment of a device according to the invention, with schematically components are shown of an assessment unit.

FIG. 4 shows schematically an exemplary embodiment of a device according to the invention, with only the assessment unit being shown schematically. The device of the third exemplary embodiment may be embodied with regards to the optic components for example similar to the first exemplary embodiment according to FIG. 1 or the second exemplary embodiment according to FIG. 2.

In the schematic illustration according to FIG. 4 the first detector 6 and the second detector 13 are combined graphically in one block.

The signal processing occurs such that both the measuring signal c1 of the first detector 6 as well as the measuring signal c2 of the second detector 13 are each assessed regarding two aspects:

The measuring signal c1 is for example FM-demodulated according to the schematic illustration in FIG. 4 so that a speed signal v1 results. Additionally, the measuring signal c2 of the second detector 13 is FM-demodulated so that a second speed signal v2 results.

It is essential that the measuring signal c1 of the first detector 13 is furthermore subjected to a power measurement in a power level (LS) and thus the power or the amplitude of the modulated carrier signal is determined and issued as signal P1.

Additionally, starting with the measuring signal c2 of the second detector 13 the power or amplitude of the modulated carrier signal is determined via another power measuring step and issued as the signal P2. The power measuring steps will generate the signals P1 and P2 in a preferred manner such that they are logarithmically dependent on the electric signal strength and thus are equivalent to a decibel value.

In a combination step (KS) now the combination occurs of the speed signals v1 and v2 into an output signal v.

Thus, the four signals P1, v1, v2, and P2 are used to generate a combined output signal v, which is more reliable than each individual signal v1 or v2.

The preferred method to combine the signals is the weighed averaging of the signals v1 and v2, with the weighing factors (weighing factor w1 for signal v1 and weight factor w2 for signal v2) can be calculated from the power signals P1 and P2. The calculation can be illustrated as:

$$v = w1 \cdot v1 + w2 \cdot v2,$$

with a standardization occurring such that w1+w2=1, this means the weighing factors w1 and w2 are complementary. The calculation of the weighing factors occurs as stated above from the power signals P1 and P2, this means P1 is a function dependent on P1 and P2 (w1=f(P1, P2) and accordingly it applies that w1=f(P2, P1)). The weighing factors w1 and w2 are therefore determined via symmetric functions with regards to the parameters P1 and P2. All above-mentioned signals are parameters changing with time, so that the calculation and/or assessment must occur continuously. In a practical embodiment the assessment occurs with a predetermined clock rate, particularly at intervals from 20 kHz to 2 MHz.

The function (f) could for example cause a respective switching to the channel with the higher power in the sense of a binary switch. Additionally the function can be realized in the sense of a linear crossfading, for example f(x,y)=x/(x+y) so that it results for the weighing factors w1 and w2:

$$w1 = P1/(P1+P2)$$

and $$w2 = P2/(P1+P2)$$

In general the position signal, this means the deflection of the surface in the direction of the axis of the receiver beam, can be yielded from a phase modulation of the signals c1 and c2. Additionally the position signal can be yielded by a time integration of the speed signal.

Figure 6:
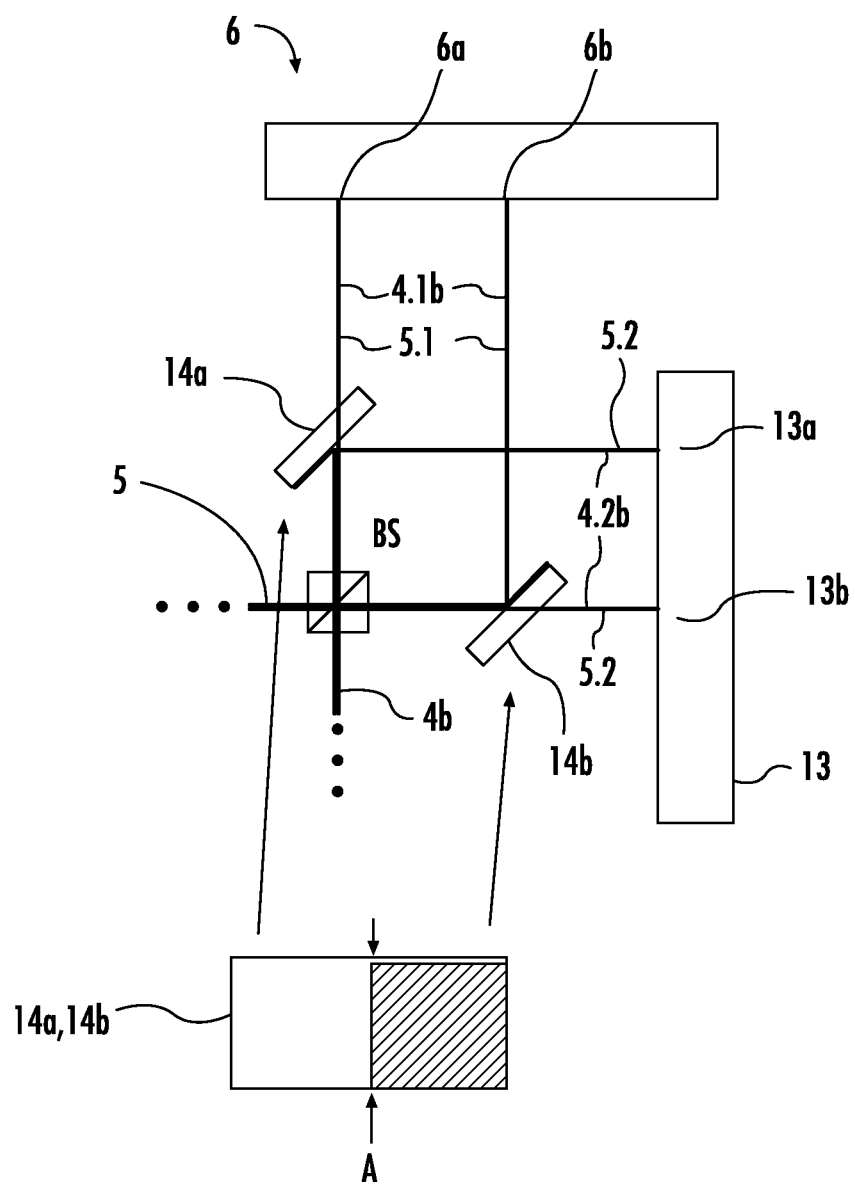
FIG. 6 is a view of a partial component of a fourth exemplary embodiment of a device according to the invention, in which a spatial splitting of a receiver beam occurs.
Figure 7:
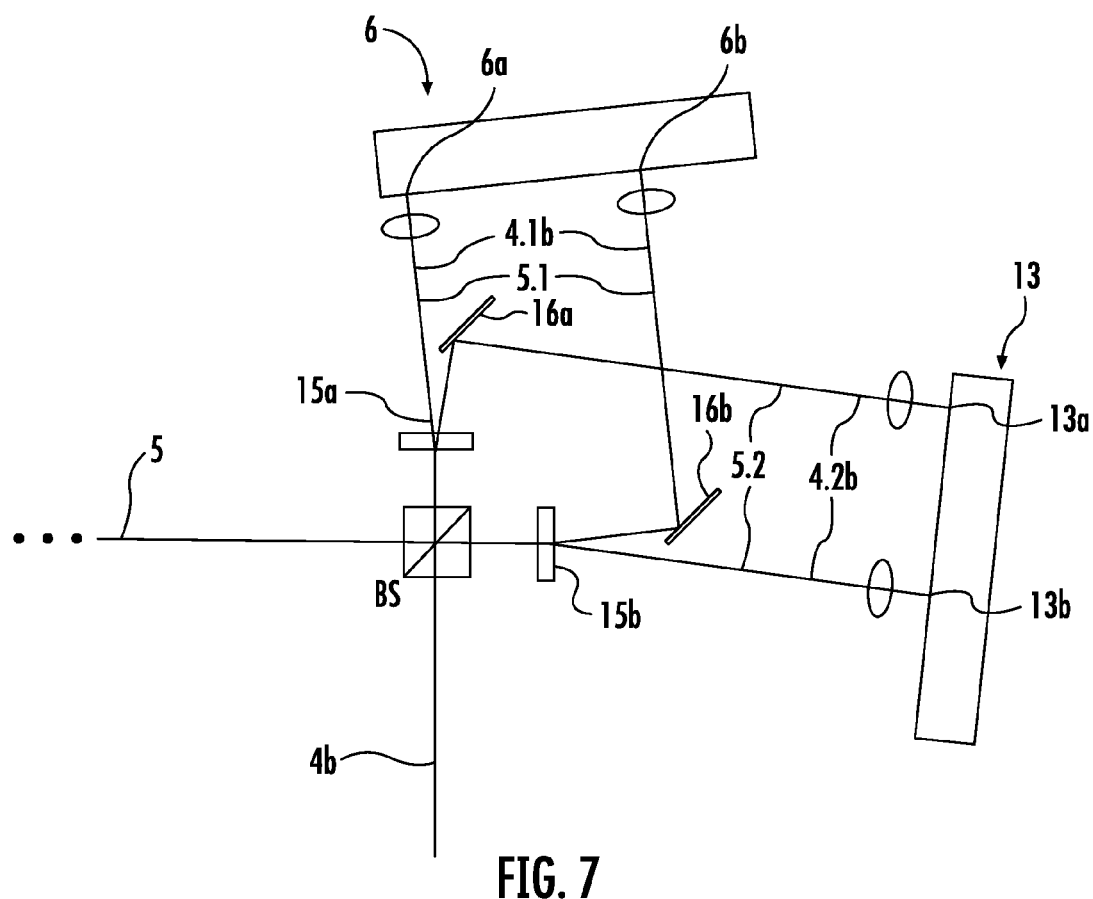
FIG. 7 is a view of a fifth exemplary embodiment of a device according to the invention in a partial illustration of its components, in which a spatial splitting of the receiver beam occurs.
Figure 8:
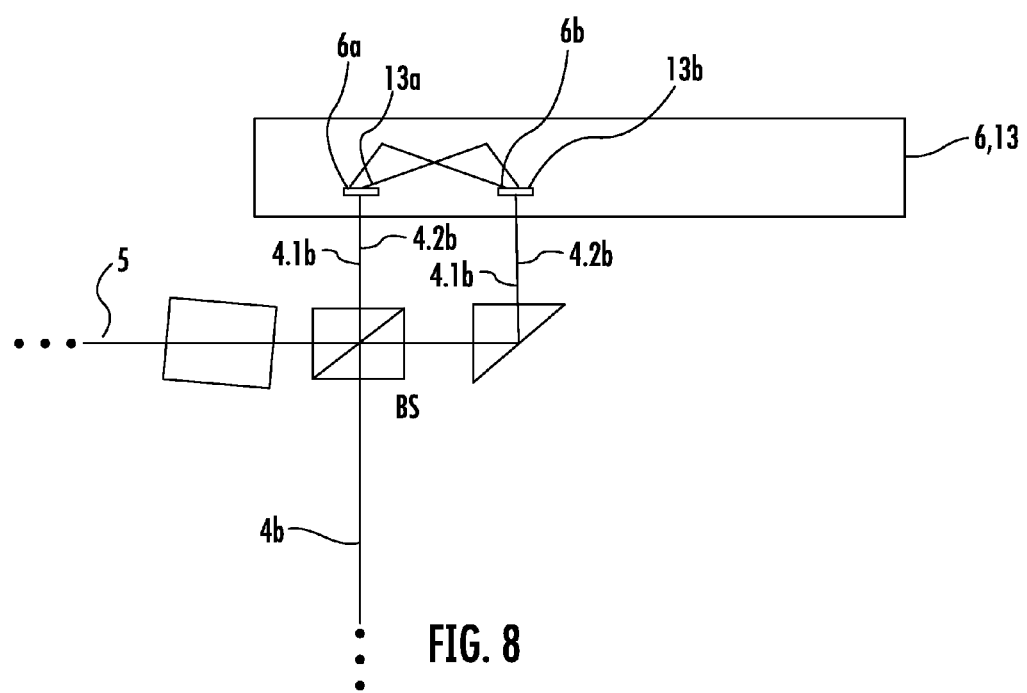
FIG. 8 is a view of a sixth exemplary embodiment of a device according to the invention, in which a spatial splitting of the receiver beam occurs.

FIGS. 6-8 schematically show exemplary embodiments 4-6, in which respectively a spatial diversity is realized, this means that the receiver beam is split with regards to different portions of beam cross-sections:

The fundamental structure of the device may here be equivalent to the standard design according to FIG. 5, with respectively the section outlined in dot-dash lines in FIG. 5 is replaced in FIG. 5 by the respective illustration in FIG. 6, FIG. 7, or FIG. 8.

The exemplary embodiments according to FIGS. 6, 7, and 8 therefore split the beam cross-section of the incident diffuse light, which results from the contributions of all lit surface points, into two halves each. Here, the partial receiver beam is guided as the first receiver beam 4.1b to the detectors 6a and 6b of the first detector and accordingly the second partial receiver beam 4b as the second partial receiver beam 4.2b to the detectors 13a and 13b of the second detector 13. The beam cross-section of the receiver beam 4b is therefore split in the exemplary embodiments of FIGS. 6, 7, and 8 each into at least two sub-sections, which sub-sections are either forwarded to the detectors 6a and 6b of the first detector or to the detectors 13a and 13b of the second detector.

Once more in all three FIGS. 6, 7, and 8 a balanced-detector arrangement is implemented, which means a first partial receiver beam 4.1b, a second partial receiver beam 4.2b, as well as a first partial reference beam 5.1 and a second partial reference beam 5.2 are each split again in order to respectively be guided to the second detectors of the first detector 6 and the second detector 13.

In the fourth exemplary embodiment according to FIG. 6 the interfered beams, with their receiver beam component showing an irregular distribution of speckles each being split into two laterally separated components. Here the separation can occur by mirrors 14a and 14b, with the mirror edge respectively being inserted into the beam or the mirrors are being embodied as partially reflecting glass plates. FIG. 6 shows schematically enlarged such an embodiment of the mirror 14a and 14b as a partially reflecting glass plate, with in this case the mirrors 14a and 14b are pushed into the radiation path of the reference beam 5 and the receiver beam 4b such that the separating edge A is located between the reflecting and the non-reflecting section of the glass plate in the center of the beam, this means that the axis of the beam impinges approximately at the boundary limit A.

This way a spatial separation is yielded in a simple fashion.

The fifth exemplary embodiment shown in FIG. 7 achieves the spatial splitting by way of micro-prism grids 15a, 15b.

Here, alternating narrow strips of the beam profile are allocated to one or the other beam and this way the spatial splitting is achieved. The elements 16a and 16b represent reflectors for the beam deflection.

The lenses 6a, 6b, 13a, and 13b are used when the beam diameter is greater than the area of the photo detectors used, the beam is focused to a small point on the detectors.

The sixth exemplary embodiment according to FIG. 8 represents a special case with regards to the embodiments of the detector.

In this case the detectors are divided.

As discernible from FIG. 8 the detector 8a of the first detector 6 and the detector 13a of the second detector 13 are arranged directly side-by-side of each other. Additionally, the detector 6b of the first detector 6 and the detector 13b of the second detector 13 are arranged directly side-by-side of each other. Such divided photo detectors are commercially available.

This way, the desired spatial splitting can be achieved in a simple fashion. Here, by the particular arrangement simultaneously a balanced detector arrangement and a spatial splitting of the receiver beam and the reference beam are achieved. Here, respectively the left half of the beams impinging the detectors are defined as the first partial receiver beam 4.1b and respectively the right half of the beams impinging the detectors as the second partial receiver beam 4.2b.

Figure 9:
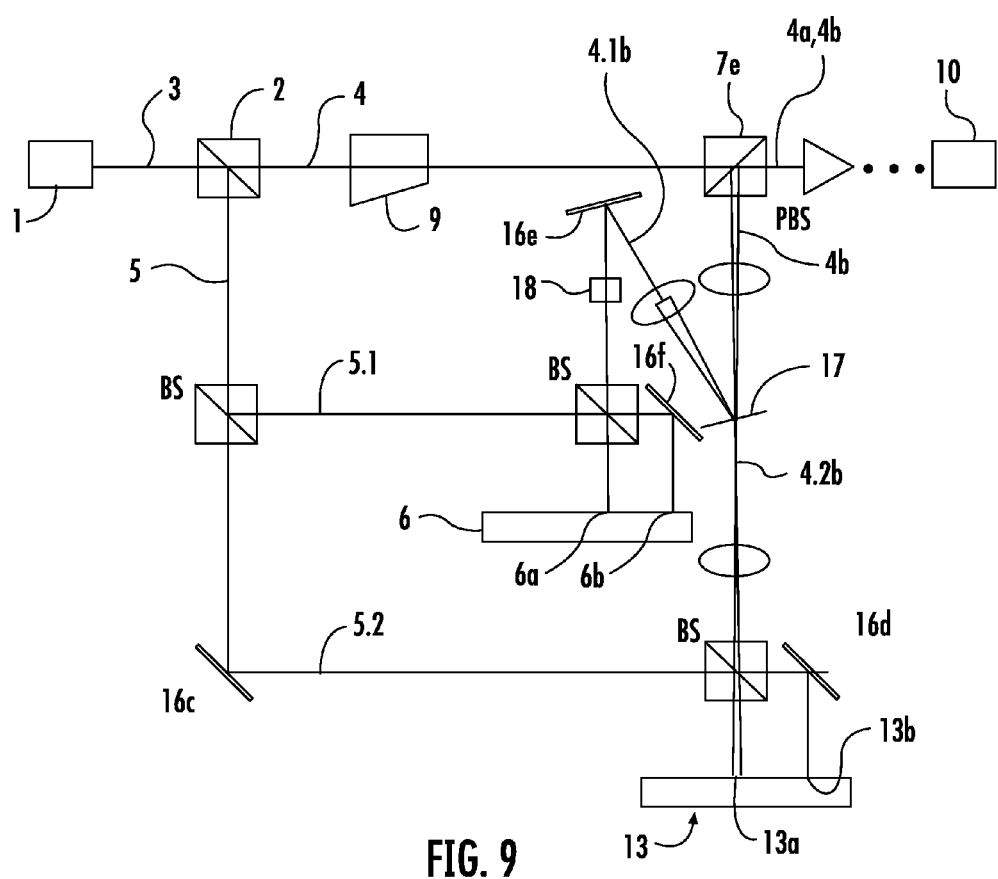
FIG. 9 is a view of a seventh exemplary embodiment of a device according to the invention, in which a splitting of the receiver beam occurs with regards to the beam modes.

FIG. 9 finally shows a seventh exemplary embodiment in which a splitting occurs with regards to the beam mode portions of the receiver beam.

Here too, starting at the radiation source 1 the source beam 3 is generated, which by the beam splitter device 2 is divided into the measuring beam 4 and the reference beam 5. The measuring beam 4 passes the Bragg-cell 9 and impinges the object 10 as the transmitter beam 4a. The transmitter beam 4*a*, at least partially reflected or dispersed, impinges a polarization beam splitter 7*i* as the receiver beam 4*b* and is guided to a spatial filter 17 embodied as a pinhole. The spatial filter 17 is embodied from a reflective substrate so that the Gauss-basic mode of the receiver beam 4*b* passes the spatial filter 17 as the first partial receiver beam 4.2*b* and is guided to the first detector 13.

The higher modes of the receiver beam 4*b* (for example the annular modes) are reflected by the spatial filter 17 and guided to the second detector 6 as the second partial receiver beam 4.1*b*.

The feeding to the detectors and the deflection of the reference beam occurs via the reflectors 16*c*, 16*d*, 16*e*, and 16*f*.

The first partial receiver beam 4.2*b* comprises, as described above, the Gauss-basic mode and can therefore directly form an interference with the first partial reference beam 5.2 on the detector 13*a* and the detector 13*b* of the second detector 13.

The second partial receiver beam 4.1*b* however must once more be converted into a Gauss-basic mode in order to form an interference with the second partial reference beam 5.1. This occurs in the exemplary embodiment according to FIG. 9 by a phase plate 18, which is arranged in the radiation path of the first partial receiver beam 4.1*b*.

The abbreviations mark the following elements in FIGS. 1-9:
BS beam splitter
BPS polarization beam splitter
HWP half-wave plate
LS power measuring step
FM frequency modulation
KS combination step The intersections comprising two arrows located at both sides perpendicular in reference to each other show in FIG. 2 each the direction of polarization of the partial receiver beam 4.1*b* and 4.2*b* (M), the partial reference beam 5.1 and 5.2 (R), as well as the mixed polarization of the receiver beam 4*b* (NP and Ms).

The invention claimed is:

1. A device for the interferometric measuring of an object (10), comprising a radiation source (1) that generates a source beam (3), a beam splitting device (2) that splits the source beam (3) into a measuring beam and a reference beam (4, 5), an optic interference device, a first detector (6) and at least one second detector (13), with the interference device and the first detector (6) embodied cooperating such that the measuring beam (4), at least partially reflected by the object, is at least partially interfered as a receiver beam (4*b*) and the reference beam (5) on at least one detector area of the first detector (6), the beam splitter device is embodied to split the source beam (3) into a measuring beam (4), a first partial reference beam (5.1), and at least one second partial reference beam (5.2) and for splitting the receiver beam (4*b*) into a first partial receiver beam (4.1*b*) and at least a second partial receiver beam (4.2*b*), the first receiver beam (4*b*) is interfered with the first partial reference beam (5.1) on the detector area of the first detector (6) and the second partial receiver beam (4.2*b*) with the second partial reference beam (5.2) is interfered on a detector area of the second detector (13), here respectively forming an optic interference, an assessment unit to evaluate measuring signals of the first and the second detector (6, 13), which is embodied to evaluate the measuring signals of the two detectors according to principles of reception diversity in which light signals of the two detectors are separated by at least one of separation with regard to polarization, spatial separation, or a modal split, a signal processing unit embodied to demodulate each of the measuring signals and combining the demodulated measuring signals by a weighed addition according to a quality criterion, wherein the measuring signals from the first and second detector are each demodulated, the measuring signals or the demodulated measuring signals from the first and second detector are assessed according to a quality criterion, and an assessment of the measuring signals or the demodulated measuring signals of the two detectors (6, 13) occurs such that a combined measuring signal is formed from the demodulated measuring signals of the two detectors, with a weighed adding of the first and the second demodulated measuring signal under consideration of the quality criterion.

2. A device according to claim 1, further comprising at least one additional optic beam splitter, which is arranged in at least one of a radiation path of the receiver beam (4*b*), the first partial receiver beam, or the second partial receiver beam (4.1*b*, 4.2*b*) and is embodied such that at least one of different polarization portions, different beam cross-sectional portions, or different modes of the receiver beam (4*b*) can be assessed with the first and the second detector.

3. A device according to claim 2, wherein the at least one additional optic beam splitter comprises a polarization device (12), which is embodied to orthogonally polarize the first and the second detector (6, 13) portions of the receiver beam (4*b*) in reference to each other.

4. A device according to one claim 3, wherein the polarization device (12) comprises a polarization beam splitter, which is arranged in the radiation path of the receiver beam (4*b*) so that the receiver beam is split into the first partial receiver beam (4.1*b*) and the second partial receiver beam (4.2*b*) and the first and the second partial receiver beam comprise different polarization components of the receiver beam.

5. A device according to claim 4, wherein the polarization beam splitter is additionally arranged in the radiation path of the reference beam (5) so that via the polarization beam splitter acts as the beam splitting device to split the reference beam into the first and the second partial reference beams (5.1, 5.2).

6. A device according to claim 5, wherein axes of the source beam of the transmitter beam and the receiver beam (4*a*, 4*b*) are located parallel to each other at least between a beam output of the device and the object (10).

7. A device according to claim 5, wherein the axes of the source beam of the transmitter and receiver beams (4*a*, 4*b*) are located side-by-side, spatially separated next to each other, at least between a beam outlet of the device and the object (10).

8. A device according to claim 1, wherein the weighted addition is by weighing dependent on the signal strengths of the measuring signal of the first and the second detector (6, 13).

9. A device according to claim 1, wherein in the radiation path of the measuring beam and the receiver beam a transceiver lens is arranged, axes of the measuring beam and the receiver beam penetrate an aperture of the transceiver lens parallel and spatially separated, and a beam intensity profile of at least one of the measuring beam or the receiver beam is formed such that the majority of the aperture of the transceiver lens is used, and the beam intensity profile of the at least one of the measuring beam or the receiver beam is embodied elliptical with an axial ratio ranging from 1:1.5 to 1:2.5.

10. A device according to claim 1, wherein the two detectors are embodied as balanced detectors.

11. A method for the interferometric measuring of an object (10) comprising the following processing steps:
generating an output beam via a radiation source (1);
splitting the output beam into at least one measuring beam and at least one reference beam (4, 5);
impinging at least one measuring point on the object (10) with the measuring beam (4) as a transmitter beam (4a),
interfering the at least one measuring beam (4), at least one of partially reflected or dispersed by the object (10) as a receiver beam (4b), with the reference beam (5) on a detection area of a first detector (6), forming an optic interference;
wherein a source beam (3) is split into the measuring beam (4), a first partial reference beam (5.1), and at least one second partial reference beam (5.2) and a receiver beam is split into a first partial receiver beam (4.1b) and at least a second partial receiver beam (4.2b), the first partial receiver beam (4.1b) is interfered with the first partial reference beam (5.1) on the detection area of the first detector (6) and the at least one second partial receiver beam (4.2b) is interfered with the at least one second partial reference beam (5.2) on a detection area of a second detector (13), each with the formation of an optic interference, and first and second measuring signals of the first and the second detectors (6, 13) are assessed according to a principle of reception diversity in which the light signals of the two detectors are separated by at least one of separation with regard to polarization, spatial separation, or a modal split,
demodulating each of the measuring signals from the first and second detector, and
assessing the measuring signals or the demodulated measuring signals of the two detectors (6, 13) according to a quality criterion and forming a combined measuring signal from the demodulated measuring signals of the two detectors, with a weighed adding of the first and the second demodulated measuring signal under consideration of the quality criterion.

12. A method according to claim 11, wherein via the first detector (6) at least one of different polarization portions, different beam cross-sectional portions, or different modes of the receiver beam are measured in reference to the second detector (13).

13. A method according to claim 11, wherein the first measuring signal a first weighing factor and for the second measuring signal a second weighing factor is formed, said weighing factors are complementary to each other such that the sum of said weighing factors is equal to one and are each formed dependent on the first and the second measuring signals.

14. A method according to claim 13, wherein the first and the second weighing factors are formed based on an amplitude of the first and the second measuring signal, and the weighing factors are formed such that respectively the measuring signal with the greater amplitude is weighed by 100% and the measuring signal with the lower amplitude by 0% or that the weighing occurs linearly according to a ratio of the amplitudes.

15. A method according to claim 11, wherein at least one of a polarization state of the measuring beam or the receiver beam are influenced by an optic device such that receiver channels of both of the detectors (6, 13) show essentially a same signal strength during measuring of a metallic reflective object.

16. A method according to claim 15, wherein the optic device used comprises an optic delay plate.

* * * * *